United States Patent
Hartz et al.

(10) Patent No.: US 6,928,854 B2
(45) Date of Patent: Aug. 16, 2005

(54) METHOD FOR DETECTING MALFUNCTIONING IN A SENSOR

(75) Inventors: Martin Hartz, Luebeck (DE); Manfred Strohrmann, Karlsruhe (DE); Detlev Straub, Stuttgart (DE); Christof Hammel, Stuttgart (DE); Juergen Biester, Boeblingen (DE); Udo Schulz, Vaihinen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 317 days.

(21) Appl. No.: 10/168,670
(22) PCT Filed: Dec. 20, 2000
(86) PCT No.: PCT/DE00/04556
§ 371 (c)(1), (2), (4) Date: Oct. 21, 2002
(87) PCT Pub. No.: WO01/46579
PCT Pub. Date: Jun. 28, 2001

(65) Prior Publication Data
US 2003/0055578 A1 Mar. 20, 2003

(30) Foreign Application Priority Data
Dec. 22, 1999 (DE) .......................................... 199 61 944

(51) Int. Cl.$^7$ ............................................. G01M 15/00
(52) U.S. Cl. .......................................... 73/1.16; 73/1.34
(58) Field of Search ................................ 73/1.16, 1.34, 73/116, 118.1; 702/104

(56) References Cited

U.S. PATENT DOCUMENTS

| 4,483,299 A | | 11/1984 | Otobe et al. |
| 4,546,647 A | * | 10/1985 | Takahashi .................. 73/118.1 |
| 5,617,337 A | | 4/1997 | Eidler et al. |
| 5,741,964 A | * | 4/1998 | Mizutani .................... 73/118.2 |

FOREIGN PATENT DOCUMENTS

| DE | 40 38 337 | 6/1992 |
| EP | 0 778 406 | 6/1997 |
| GB | 2 285 145 | 6/1995 |

* cited by examiner

Primary Examiner—Robert Raevis
(74) Attorney, Agent, or Firm—Kenyon & Kenyon

(57) ABSTRACT

A method for detecting a malfunction of a sensor measuring a measured quantity is provided, in which a signal-range check for the output signal of the sensor is performed, provided that the measured quantity is within a permissible range. If the measured quantity is outside the permissible range, no signal-range check is performed, but the output signal is used for detecting the measured quantity and for further calculations. The sensor may be, for example, a hot-film air-mass meter. If this is the case, the measured quantity is the drawn-in air mass, and the signal-range check is performed, provided that the engine operating state and thus the drawn-in air satisfies specifiable conditions. In addition to the signal-range check, onboard diagnoses with regard to specifiable plausibility criteria relating to the offset-drift and/or the sensitivity-drift of the sensor may also be performed.

15 Claims, 2 Drawing Sheets

METHOD FOR DETECTING MALFUNCTIONING IN A SENSOR

FIELD OF THE INVENTION

The present invention relates to a method for detecting a malfunction of a sensor.

BACKGROUND INFORMATION

Sensors that detect a measured quantity essential for controlling internal combustion engines, such as the air drawn in by the internal combustion engine, should be monitored to detect malfunctions in a reliable manner. One way to determine a malfunction is by implementing a signal-range check, for example. In such a signal-range check or signal-amplitude analysis, the output signal of the sensor is monitored to determine whether it lies within a plausible range. A signal-range check may be performed, for example, by determining whether the output signal of a sensor lies between an upper and a lower limit. If the output signal exceeds the upper limit or undershoots the lower limit, a malfunction is determined and displayed.

A signal-range check for monitoring an air-mass flow sensor of an internal combustion engine is referred to, for example, in European Published Patent Application No. 0 778 406. The malfunction detection method referred to not only performs a signal-range check on the basis of fixed limits, but also determines a permissible range for the output signal of the air-mass flow sensor as a function of the opening angle of the throttle valve. As the opening angle of the throttle valve increases, so does the output voltage of the air-mass sensor regarded as plausible. If the output signal lies outside the plausible range, a fault is detected and the output signal is no longer considered in further signal analysis.

SUMMARY OF THE INVENTION

It is believed that an exemplary method according to the present invention for detecting a malfunction of a sensor has an advantage in that the detection of a malfunction is more reliable and a signal analysis is possible. This may result from only performing the signal-range check for the sensor output signal or the sensor output voltage, if the respective measured value lies within a specifiable range. However, the output signal of the sensor is considered when calculating the measured value, even if the measured value does not lie within the specifiable range. If the measured value lies within the specifiable range and the signal-range check for the output signal of the sensor indicates that the sensor output signal does not satisfy the expected plausibility conditions of the signal-range check, a fault is detected and the sensor output signal either is not processed further or is only processed after an additional check to detect the measured value.

An exemplary method according to the present invention for detecting a malfunction of a sensor may be used in connection with an engine control system, in which the output signals of different sensors are processed in an engine control device to determine a particular measured variable and to calculate a control signal for engine operation. An exemplary method according to the present invention may be performed, for example, for analyzing the output signal of an air mass flow sensor, such as a hot-film air-mass meter, which determines the air mass drawn in by an engine and supplies an output signal to the control device. Using a signal-range check, the output signal of the air mass flow sensor is checked only in a specifiable partial operating range of the engine. Outside this engine operating range, the output signal of the air mass flow sensor continues to be analyzed. Since this signal is usually correct, a significant emission reduction may be achieved compared to other systems, which switch to substitute values in such cases.

However, the exemplary methods according to the present invention to determine a sensor malfunction may also be used in other systems, that is, they are not limited to use only in a motor vehicle.

Various exemplary methods according to the present invention are supplemented by an onboard-diagnosis (OBD), which operates in the engine control device or in the control device of the internal combustion engine and at least includes plausibility checks of the offset drift and the sensitivity drift of the respective sensor or sensors, and runs when the motor is at a standstill.

DETAILED DESCRIPTION

Figure 1:
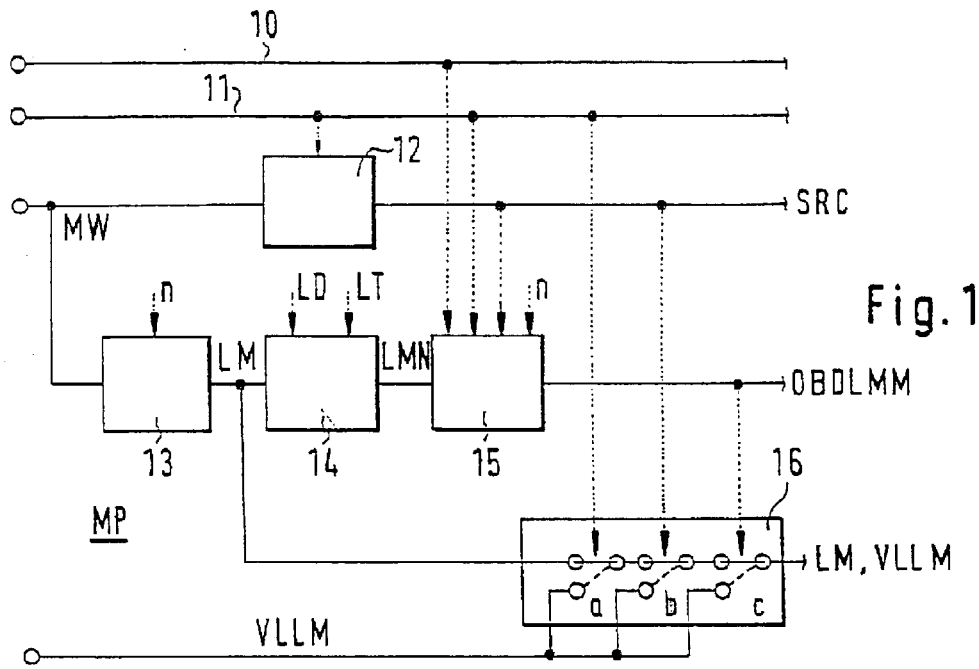
FIG. 1 shows an exemplary embodiment according to the present invention for implementing a method for monitoring the output signal of an air mass flow sensor.

FIG. 1 shows an exemplary embodiment according to the present invention based on a hot-film air-mass meter, which detects the air flow drawn in by an internal combustion engine as a measured value. The internal combustion engine includes components not shown but required.

The hot-film air-mass meter supplies an analog output voltage, the magnitude of which is a function of the air mass flowing in the intake manifold of the internal combustion engine or the engine. The analog output voltage is designated as measured value MW. The sensor element (not shown) is installed in the intake manifold of the internal combustion engine, together with the evaluation circuit. To detect the air flow, a centrally located heating resistor element heats a sensor membrane on the sensor element. The temperature distribution on the membrane is detected by two temperature resistor elements, which are symmetrically disposed with respect to the heating resistor element. An air mass flowing over the sensor changes the temperature distribution of the membrane, resulting in a resistance differential between the upstream and the downstream temperature resistors. The resistance differential is a function of direction and volume, so that the air-mass flow sensor may simultaneously register the volume and the direction of an air-mass flow. Due to the small dimensions of the micromechanical sensor element, a short response time is obtained. Therefore, the sensor is a ratiometric sensor.

The output signal of the air-mass flow sensor is processed by a microprocessor MP. This microprocessor may be part of the control device of the internal combustion engine, but in a variant embodiment according to the present invention, the microprocessor may also be an integral part of the sensor. As described below, various plausibility checks or fault detections are performed by the microprocessor. For this purpose, the control device of the internal combustion engine and/or the microprocessor access(es) the required information. The control device is supplied with all the variables or information required for the operation of the internal combustion engine, which may be obtained with the aid of sensors, for example. As described below, these variables include those required to implement an exemplary method according to the present invention.

In accordance with an exemplary method of the present invention, with reference to the block circuit shown in FIG. 1, the control device checks the validity of the air-mass flow signal. The air-mass flow sensor may detect pulsating air-mass flows and has no fixed lower or upper voltage limits. Therefore, the air-mass flow sensor may generate output signals at voltages up to its supply voltage. To help prevent the pulsations from causing faults in the detection of the air-mass flow, the validity of the averaged air-mass flow may be checked. When performing the signal-range check, operating ranges of the internal combustion engine, within which an analysis of the output signals of the air-mass flow sensor may be problematic, should be excluded from consideration.

In FIG. 1, different fault detections or fault paths, as well as plausibility checks performed by microprocessor MP to check the operability of the individual components, are plotted. In this context, reference numeral 10 denotes the fault path of the air system, and reference numeral 11 denotes the reference voltage of the fault path signal-range check, where the reference voltage for the sensor is checked for plausible values. Reference numeral 12 denotes the signal-range check for the output signal of the air-mass flow sensor, to which measured value MW for the air-mass flow is supplied as an input variable. At the output of the block for signal-range check 12, the result of the signal-range check for air-mass flow sensor SRC is available.

However, the signal-range check of the measured value for the air-mass flow supplied by the sensor is only performed if no prior fault has been detected in the reference-voltage supply. In the fault path signal-range check 11 for detecting a fault in the reference-voltage supply, faults, such as cable drop-off, short-circuit to ground, short-circuit to the supply voltage, and a short-circuit to battery voltage may be detected. For this purpose, a standard signal-range check of the reference voltage is implemented. This is accomplished either via the driver block or by separately detecting the output voltage of the driver-block. A detected fault is transmitted to block 12 via the connection between 11 and 12, and the actual signal-range check for the sensor output signal is omitted.

In addition, block 13 divides the output signal of the air-mass flow sensor, i.e., the measured value MW for the air-mass flow, by the rotational speed of the engine. The result is the actual air mass LM. To perform the division, speed n, which may be known in the control device, is supplied to block 13. In block 14, air mass LM is normalized while the charging-air pressure is detected. Charging-air pressure LD and air temperature LT, which may be detected by appropriate sensors, are supplied to block 14 for this purpose.

Block 15 performs the plausibility check for normalized air-mass signal LMN. For this purpose, normalized air mass LMN and speed n are supplied to block 15. In addition, block 15 is provided with the results of the fault path of air system 10, the fault path of signal-range check reference voltage 11, and the result of the signal-range check performed in block 12. By analyzing these variables, plausibility checks may effect an onboard diagnosis for the air-mass flow sensor. The result is available as signal OBDLMM.

Depending on the result of the individual checks, the control device uses a value for the valid air mass selected via a switchover 16 in further calculations. This switchover, which includes three individual switchover-arrangements a, b and c, permits either air mass LM calculated from the sensor-output signal or a specified value for air mass VLLM to be provided for further analysis. Whether the specified value for the air mass or calculated value VL is transmitted as an instantaneous air mass depends on the results of the individual faults, plausibility checks, or the signal-range checks, on the basis of which switchovers of switchover-arrangements a, b and c are implemented. A fault in fault path 11 switches directly to specified value VLLM via switching-arrangement a. A fault in signal-range check 12 switches to the specified value via switching-arrangement b, and a detected non-plausibility in block 15 causes a switchover to specified value VLLM via switching-arrangement c. Specified value VLMM may also be a value that the control device estimates from various measured variables, for example.

Since signal-range check 12 is only performed in specifiable operating states of the engine, the switchover to specified value VLLM via switching-arrangement b may not occur if no signal-range check is performed. Thus, measured air mass LM is transmitted for further processing if no signal-range check is performed.

Certain time conditions may also be considered when performing the individual signal-range checks. Specifically, the signal-range checks may be performed according to the following exemplary methods of the present invention.

1. Signal-range Check Low

A fault occurs if the speed is within the permissible range for the signal-range check, that is, when the check indicates that the speed is between a minimum value nSRCmin and a maximum value nSRCmas and air mass LM is below a minimum value for air mass LMSRCmin, at which a signal-range check may still be performed. If such a fault occurs, the sensor signal continues to be checked for its validity, and the measured value is transmitted. If the sensor remains faulty for a specifiable period of time exceeding a limiting value, the sensor is recorded as faulty and the substitute functions are activated. The sensor signal then continues to be monitored for its validity.

The sensor is regarded as restored or intact if the speed lies in a permissible range for the signal-range check, i.e., nSRCmin≦n≦nSRCmax, and, for a time exceeding a limiting value t>tHFMSRCOK, the air mass is greater than a minimum air mass LM>LMSRCmin regarded as permissible given a valid signal-range check, provided that no other signal-range check fault has occurred in the air-mass flow sensor. The substitute functions are reversed again once the sensor is regarded as restored.

2. Signal-range Check High

The signal-range check high-check is active if, at instantaneous rotational speed and for a minimum time TSRCakt, the injection quantity MES, which is defined as the sum of the desired quantity and the quantity calculated by the idle-speed controller, is below a speed-dependent limit. This measure leads to a restriction of the signal-range checks to operating points with limited speed and limited charge-air pressure.

A fault is present if the check determines that, at active signal-range check, the air mass is greater than the maximum value at permissible signal-range check LM>LMSRCmax. The sensor signal then continues to be monitored for its validity and the measured value is transmitted. That is, the measured value is supplied for further calculations. Alternatively, the last valid value is retained and transmitted.

If the sensor, given an active signal-range check, remains faulty for a specifiable time t>tHFM, the sensor is recorded as faulty and the substitute function is activated. The sensor signal continues to be analyzed for its validity. The sensor is regarded as restored or intact if it indicates at active signal-range check for an additional time t>tHFMOK that the air mass is below the maximum value at permissible signal-range check LM<LMSRCmax, provided that no other signal-range check fault has been detected in the air-mass flow sensor. The substitute functions are reversed again once the sensor is determined to be restored. If the signal-range check is not active, no fault will be transmitted to the control device. Existing faults may not be remedied if the signal-range check is not active.

Figure 2:
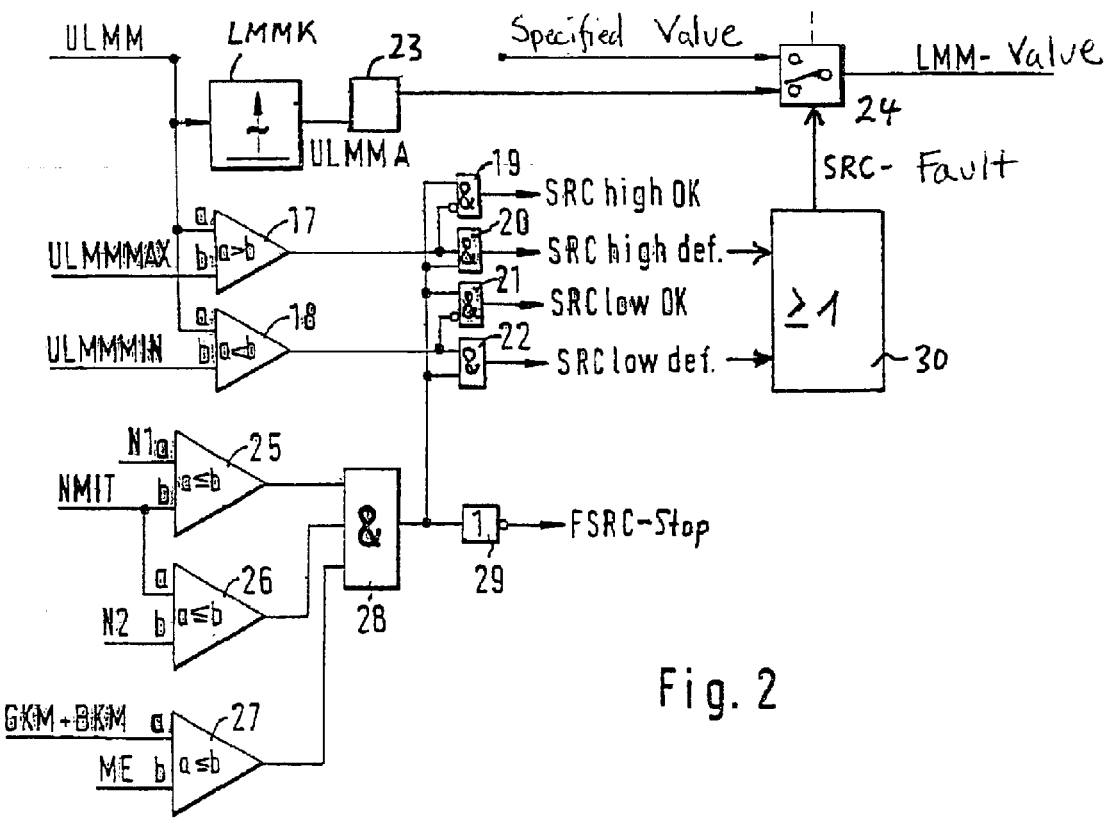
FIG. 2 shows a logic circuit representing various conditions for fault detection.

FIG. 2 shows another exemplary embodiment according to the present invention. In this context, the signal-range check analyzes the sensor-output voltage ULMM to ascertain whether it is within a permissible range. For this purpose, comparator 17 compares the sensor voltage ULMM to a maximum value for air mass LMMMAX and comparator 18 compares the sensor-output voltage to a minimum value of air mass LMMMIN. The two comparators 17 and 18 are connected to four AND-gates 19, 20, 21 and 22, which are additionally supplied with a signal indicating whether a fault detection via signal-check range is to be performed.

The signal indicating whether a fault detection is to be performed is formed by the three comparators 25, 26 and 27 and AND-gate 28. In this context, it is presumed that the signal-range check is switched off outside of a rotational-speed window and above a quantity threshold, since erroneous fault detections may otherwise occur. To specify the window for the signal-range check, the comparators compare a first speed value N1 to a speed averaged value NMIT. A second comparison is performed by comparing a rotational-speed value N2 to the averaged value NMIT, and a third comparison checks whether the sum of selected fuel quantity GKM and fuel amount BKM calculated by the idle-speed controller is below a speed-dependent value.

Only if all conditions:

$$N1 \leq NMIT < N2 \text{ and } GKM+BKM \leq ME$$

are satisfied, will a fault detection SRC be permitted. The output signal of AND-gate 28 is supplied to AND-gates 19 through 22, the signal stop fault detection SRC being generated at the output of inverter 29.

The following checks are implemented in SRC:

If the sensor voltage is greater than the maximum value of the air mass, and if a signal-range check is to be performed, the signal will be detected as valid (SRC high ok). If one of these two conditions is not satisfied, (SRC high faulty) will be detected. The same applies, for example, to the minimum values of the air mass, (SRC low OK) or (SRC low defective) being detected.

Regardless of whether a signal-range check is performed, sensor output voltage ULMM is processed further. That is, air mass LMM is calculated from sensor voltage ULMM even if a fault was detected in the signal-range check, provided certain conditions allowing a signal-range check are not satisfied. Therefore, air mass LMM is calculated without limitations from sensor voltage ULMM, within and outside the monitoring range of the signal-range check. If a fault is detected in an operating range of the engine allowing a signal-range check (on a preliminary or definite basis), the value of sensor voltage ULMMA last recorded as valid is used to calculate the air mass. This value ULMMA may be available in memory device 23, the most current sensor output voltage being recorded in memory device 23. Value ULMMA is formed from sensor voltage ULMM, considering the characteristic curve of air-mass flow sensor (LMM). The switchover to the stored substitute value or specified value is performed by a switching arrangement 24, which is switched if a fault is detected in block 30.

By the arrangement for implementing the signal-range check in accordance with an exemplary embodiment of the present invention as shown in FIG. 2, the desired checks may be performed, it being of no consequence whether the arrangement according to FIG. 2 is implemented as hardware or whether it runs as a method in the microprocessor of the control device.

Figure 3:
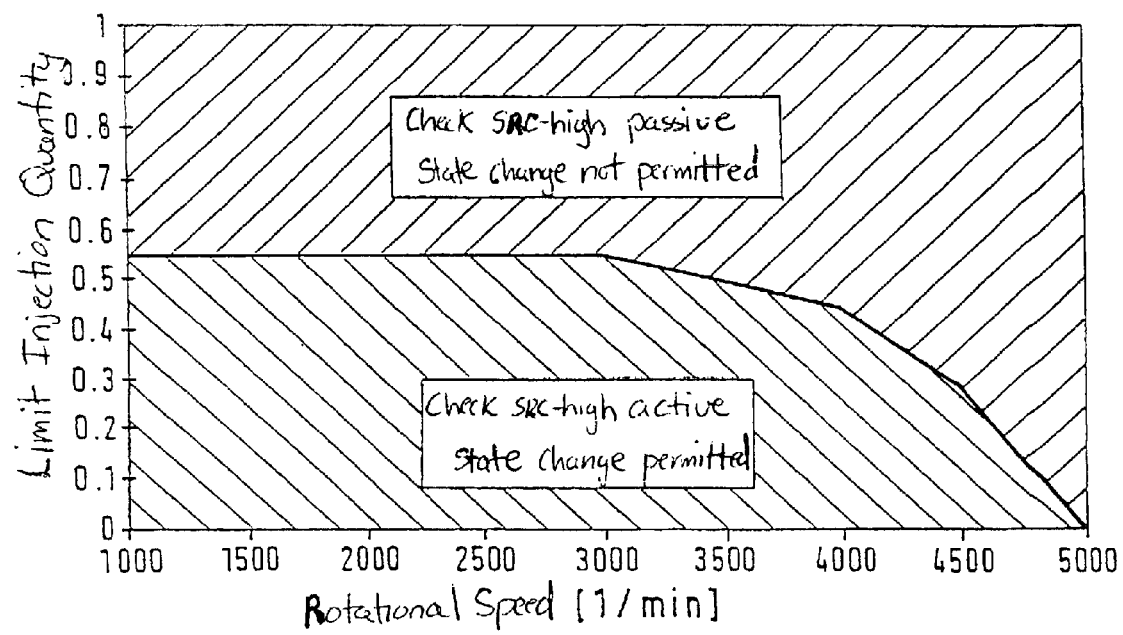
FIG. 3 is a diagram showing ranges of the measured variable in which a signal-range check may and may not be performed for an engine control.

In FIG. 3, the conditions allowing or not allowing a signal-range check high are shown. Specifically, FIG. 3 shows the limit for the injection quantity above the rotational speed. In the upper part, the check of the signal-range check is high-passive, with no state change being permitted. In the lower part of FIG. 3, the check signal-range check is high-active and a state change is permitted. The measured value is processed in both ranges, provided that the implemented SRC does not indicate a fault.

FIG. 3 does not show the conditions allowing a signal-range check-low. SRC-low is only permitted above a minimum speed and only if a (cut-off) throttle valve in the vehicle, if installed, is not closed.

The plausibility checks shown in block 15 of the exemplary embodiment described with reference to FIG. 1, which run as onboard-diagnosis (OBD) in the control device of the internal combustion engine during normal operation, are described in more detail below. Test possibilities for an offset and a sensitivity drift should be provided for a plausibility check. The plausibility check is active if no signal-range check fault for the sensor and the sensor signal is present in the reference voltage. Similarly, a plausibility violation may be remedied if no signal-range check fault is present in the reference voltage for the sensor and for the sensor signal. The plausibility check includes various checks, two of which are described in more detail below.

Plausibility Check of the Offset Drift

In this plausibility check, which may be performed, for example, on a hot-film air-mass meter, a distinction is made between offset-drift low and offset-drift high. In the plausibility check offset-drift high, a fault is detected if the output voltage of the sensor at speed zero, that is, the offset voltage, is above a specifiable first threshold representing a possible maximum value. In the plausibility check offset-drift low, a fault is detected if the output voltage of the sensor at speed zero is below a specifiable second threshold representing a plausible minimum value. The plausibility check of the offset-drift is performed when the internal combustion engine is first operated, as soon as an "ignition on" signal is detected or during the launching phase or during after-running of the control device, i.e., at speed zero. Since no air flows, the sensor merely supplies an offset voltage as output voltage. This output voltage of the sensor is controlled to a particular voltage range in a specifiable sampling raster. In a 20 ms raster, for example, at speed n=0 it may be checked whether the condition $$UOBD,\text{min} < +Ua < UOBD,\text{max}$$

is satisfied. Accordingly, the plausibility of the air-mass detection is violated if the sensor-output voltage Ua at speed zero leaves the specified voltage window, this window being delimited by a minimum value UOBD,min and a maximum value UOBD,max. However, the sensor signal may be controlled further for plausibility, and the measured value obtained in each case may be transmitted. The sensor will be presumed to be temporarily defective. If the sensor remains defective for a specifiable time t>tOEDDEF, the plausibility violation is detected as definite and recorded, and the normally present substitute functions are activated. The sensor signal, however, continues to be analyzed for its validity so that a possibly occurring fault remedy may be detected. Such a fault remedy is detected or the plausibility to be checked is regarded as restored if the following two conditions are satisfied for an additional specifiable time t>tOBDOK:

at speed $n=0$:UOBD, min<+Ua<UOBD, max at speed $n=0$: no plausibility violation The substitute functions are reversed again in each case once the sensor is regarded as restored.

Plausibility Check of the Sensitivity Drift

In addition to the offset drift, the sensitivity drift should also be monitored for plausibility. The sensitivity drift in the air-mass sensor is checked for plausibility exclusively when the exhaust-gas recirculation valve is closed and when the air-mass system is determined to be intact. The information indicating that the exhaust-gas recirculation valve is closed may be available in the control device, if appropriate. In systems including a charge-air pressure sensor (LDF) and a temperature sensor (TF) after the charge-air cooler, the signal of the air-mass flow sensor may be compared to a substitute value calculated using the general gas equation. The following relationship holds:

$ML.TL/pL$=constant,

ML being the air mass, TL being the temperature of the drawn-in air after the charge-air cooler measured with the aid of a temperature sensor, and pL being the measured charging-air pressure measured with the aid of a pressure sensor. In this way, the air mass measured at a temperature TL and a charging-air pressure pL may be normalized to normal conditions TLO. The normalized value is then monitored using a window function for an upper and a lower plausible limiting value.

The following relationships apply:

$MLO=ML(TL,pL).TL.pL0/pL.TLO$ (1)

with: nOBD, min$\leq$n$\leq$nOBD,max
and ME,OBD,min<ME,Sum<ME,OBD,max.

The plausibility of the air-mass detection is violated if the detected normalized air mass leaves the specified window. The sensor signal will then continue to be controlled for plausibility and the measured value will be transmitted in each case. If the sensor remains faulty for a specified time t>tHFM, D, the plausibility violation is recorded as definite and the substitute functions are activated. The sensor signal is also analyzed for its validity, and plausibility is regarded as restored when the previous condition is satisfied for a time t>tHFMOK and for nOBD,min. In this case, the detected normalized air mass lies within the mentioned air-mass range. The substitute functions are reversed again once the plausibility is regarded as restored.

In case of systems in which a temperature sensor and/or a charging-air pressure sensor is/are not included, it is instead reverted to a substitute value TL,Ers and pL,Ers, respectively. The inserted substitute value is applicatively determined.

In an addition to the plausibility check of the sensitivity drift of the sensor, the measured air mass per time is set in relation to the normalized air mass calculated using the gas equation. This ratio is checked for a lower and upper limit ratio, and if the ratio is below the lower limit or above the upper limit, the plausibility fault "sensitivity drift low" or "sensitivity drift high" is generated.

What is claimed is:

1. A method for detecting a malfunction of a sensor, the sensor detecting a measured variable of an internal combustion engine, an evaluation unit processing an output signal of the sensor, the method comprising:
   performing a signal-range check of the output signal of the sensor by comparing the output signal of the sensor to at least one specifiable limiting value;
   wherein the malfunction is detected if the output signal deviates from the limiting value in a specifiable manner, the signal-range check is only carried out inside a specifiable range of operating states of the internal combustion engine, and the output signal of the sensor is processed even if the operating states of the internal combustion engine are not within the specifiable range.

2. The method of claim 1, wherein the sensor includes an air mass flow sensor, the measured variable includes an air mass drawn in by the internal combustion engine, and a control device of the internal combustion engine performs the signal range check and the processing of the output signal of the sensor.

3. The method of claim 1, wherein the specifiable range of operating states is formed as a function of a rotational speed of the internal combustion engine.

4. The method of claim 1, wherein the specifiable range of operating states is formed as a function of at least one of an injection quantity and a combination of a rotational speed of the internal combustion engine and the injection quantity.

5. The method of claim 4, wherein the signal range check is performed only if an injection quantity limit is less than a specifiable quantity, the specifiable quantity being a function of a speed, the specifiable quantity decreasing with an increase in the speed.

6. The method of claim 1, wherein the signal-range check includes a signal range check high and a signal range check low, the malfunction being detected in signal range check low if the measured variable is less than a specifiable minimum value, and the malfunction being detected in signal range check high if the measured quantity is greater than a specifiable maximum value.

7. The method of claim 1, wherein a system reverts to a value previously recognized as correct when the malfunction is detected, the value being available as a substitute value for further calculations.

8. The method of claim 1, further comprising:
   performing a plausibility check of the output signal of the sensor only if the signal range check of the output signal of the sensor does not detect the malfunction, and the plausibility check includes at least one of an offset drift check and a sensitivity drift check;
   wherein further conditions are monitored in specifiable operating phases of the internal combustion engine corresponding to a rotational speed of approximately zero.

9. The method of claim 8, wherein the plausibility check of the offset drift includes checking whether an output voltage of the sensor is at least one of greater than a lower limiting value and less than an upper limiting value, a malfunction of the offset drift being detected and displayed if the check of the output voltage of the sensor is not satisfied.

10. The method of claim 8, wherein the plausibility check of the sensitivity drift is performed while an exhaust gas recirculation valve is closed and an air mass system is intact, a measured air mass being normalized to normal conditions, the normalized air mass being compared to at least one substitute value calculated using a general gas equation, the normalized air mass being detected as too large a sensitivity drift in case of a specifiable deviation, and a corresponding fault being displayed and substitute measures initiated if warranted.

11. The method of claim 10, further comprising:

performing at least one of a comparison to an upper substitute value and a comparison to a lower substitute value when the sensitivity drift is checked for plausibility, a non plausibility being detected if a specifiable deviation results.

12. The method of claim 8, wherein the plausibility check is continued for a specifiable time after the malfunction is detected, a definite fault being detected and a substitute function being activated only after the specifiable time has elapsed at continuing implausibility.

13. The method of claim 8, wherein the plausibility check is continued for a specifiable time after the malfunction is detected, a fault remedy being adopted when plausibility is detected.

14. The method of claim 8, wherein the further conditions include voltage conditions.

15. A device for detecting a malfunction of a sensor, comprising:

at least one control device including a microprocessor and a triggering arrangement for triggering required measures and for activating substitute functions if the malfunction is detected, the microprocessor receiving required quantities for detecting the malfunction by performing a signal-range check of the output signal of the sensor by comparing the output signal of the sensor to at least one specifiable limiting value;

wherein the malfunction is detected if the output signal deviates from the limiting value in a specifiable manner, the signal-range check is only carried out inside a specifiable range of operating states of the internal combustion engine, and the output signal of the sensor is processed even if the operating states of the internal combustion engine are not within the specifiable range.

* * * * *